July 22, 1958  R. P. DAVIE  2,844,027
TEMPERATURE COMPENSATED FORCE BALANCE
Filed June 11, 1956  2 Sheets-Sheet 1

ROBERT P. DAVIE
INVENTOR.

BY

ATTORNEY

July 22, 1958 R. P. DAVIE 2,844,027
TEMPERATURE COMPENSATED FORCE BALANCE
Filed June 11, 1956 2 Sheets-Sheet 2
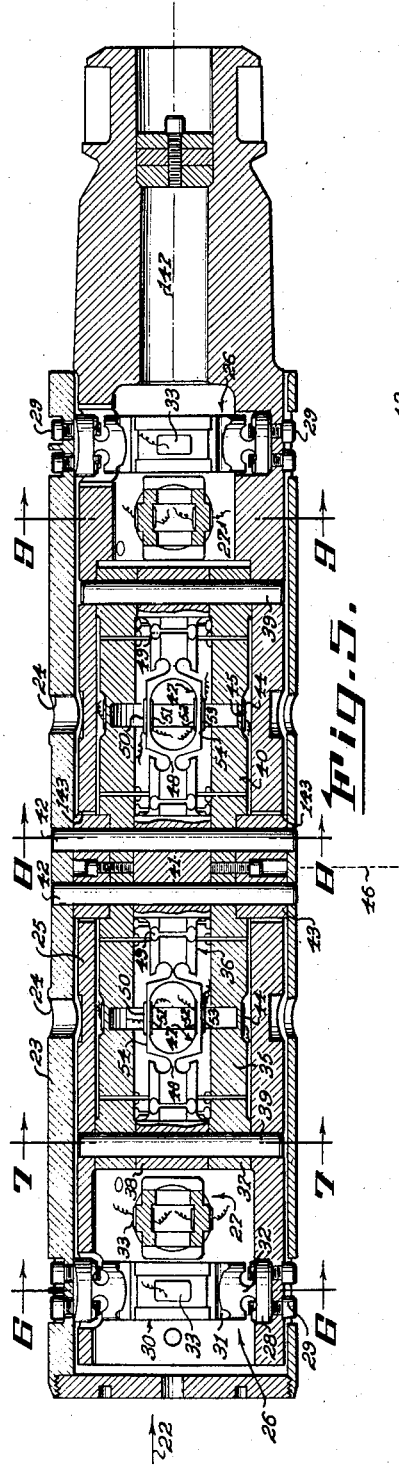
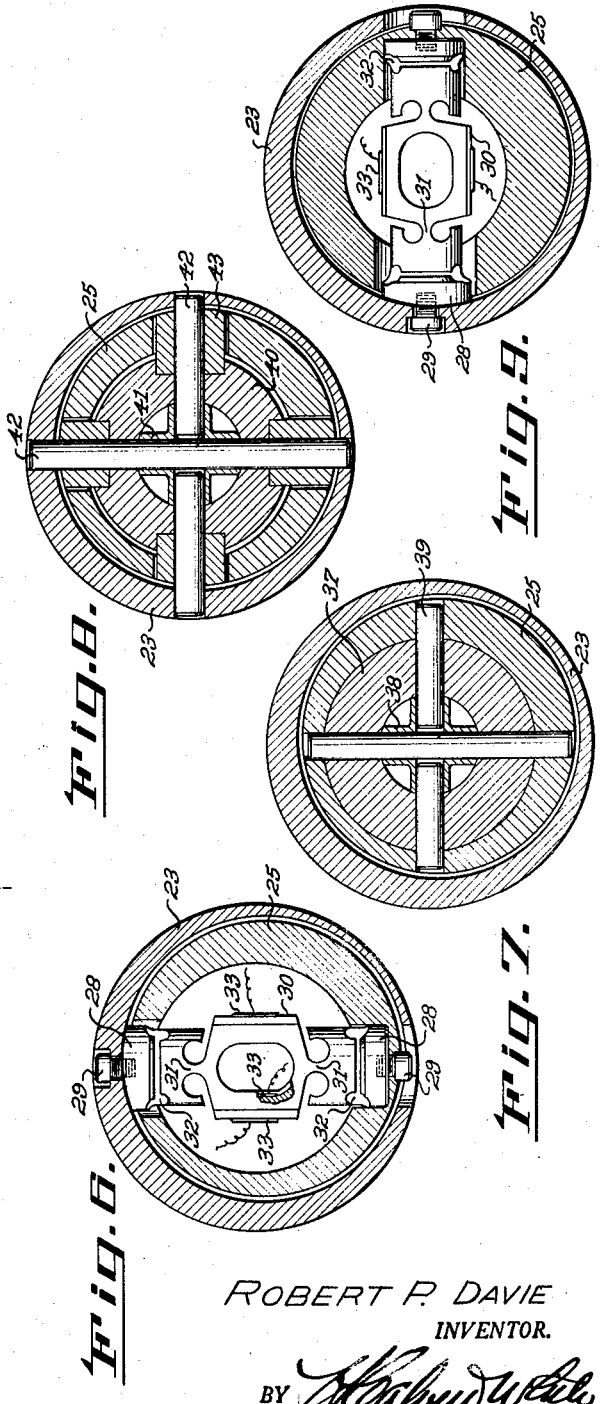
ROBERT P. DAVIE
INVENTOR.
BY
ATTORNEY

United States Patent Office 2,844,027
Patented July 22, 1958

2,844,027

TEMPERATURE COMPENSATED FORCE BALANCE

Robert P. Davie, Manhattan Beach, Calif., assignor, by mesne assignments, to Task Corporation, Pasadena, Calif., a corporation of California Application June 11, 1956, Serial No. 590,770

17 Claims. (Cl. 73—147)

This invention relates generally to force balances such as are used in supporting test bodies or models in position to be loaded, the balances incorporating force gages at such locations in relation to the directions of body loading that the gages accurately measure such loading. More particularly, the invention is directed to the solution of the problem encountered when different portions of a force balance are unequally heated or cooled resulting in differential thermal expansion thereof and giving rise to the appearance of spurious or unwanted loads measured by the gages.

In load testing models such as small aircraft in wind tunnels, it is generally the practice to mount the models upon what are known as force balances of such construction and design in relation to the positions of force gages carried by the balances that model loading will be reflected in gage outputs or indicated force measurements corresponding to loading. For the accomplishment of this purpose, the force balance is normally constructed on a pair of frames, one to mount the model and the other to be connected to rigid supporting structure, the frames being interconnected in load transmitting relation by the gage means so that the model may be effectively supported for testing and yet capable of slight deflection in response to loading for straining the gages.

Where conditions of temperature change exist, as exemplified by rather rapid model and force balance heating during the initial phase of a wind tunnel test brought about by air friction on the model, it is found that different parts of the force balance heat up and expand at unequal rates. Accordingly, where the model is mounted on an outer frame or sleeve, its temperature rises more rapidly than that of the inner frame or rod which is enclosed by the sleeve so that the force gage means interconnecting the rod and sleeve are strained as a result of relative displacement as between the rod and sleeve, and the gages indicate the presence of spurious loading due to such heating, destroying the accuracy with which the balance measures true model loading.

The present temperature compensated force balance is designed to overcome the above difficulties through balancing out or canceling the gage reading resulting from differential heating of the balance components while giving accurate and positive indications or measurements of actual loading conditions on the model supported by the balance. To accomplish temperature compensation, the invention contemplates the provision of a novel symmetrical balance having force gage means connected in axial load transmitting relation with the outer sleeve and inner rod of the balance at such axially spaced positions in relation to the locations at which the sleeve and rod are otherwise interconnected that the gage means will produce outputs corresponding to axial body loading with no change in output production in response to differential heating of the sleeve and rod. Emphasis is directed to the provision of axial force gage means in striving for temperature compensation since the significant spurious or unwanted loading produced as a result of differential heating of the sleeve and rod is axially directed.

Further in connection with the axial force gage means provided in the balance, resistance type strain gages are bonded to an elongated support at opposite sides of an axial reference position so that the resistance characteristics of the gages are changed in response to the transmission of axial loads through the support, which is connected with the sleeve at the reference position and with the rod at axial positions spaced oppositely of the reference position. With the gages then electrically connected in a bridge circuit, their equal outputs resulting from differential heating of the sleeve and rod causing the sleeve to axially expand away from the reference position relative to the rod may be made to cancel one another, whereas equal and opposite gage outputs as between gages on opposite sides of the reference position and resulting from true axial loading on the sleeve may be made to indicate the amount of such loading.

Other features and objects of the invention, as well as the details of an illustrative embodiment, will be more fully understood from the following detailed description of the drawings, in which:

Fig. 5 is a vertical section taken through the complete force balance comprising the invention;

Fig. 6 is a section taken on line 6—6 of Fig. 5;

Fig. 7 is a section taken on line 7—7 of Fig. 5;

Fig. 8 is a section taken on line 8—8 of Fig. 5; and

Fig. 9 is a section taken on line 9—9 of Fig. 5.

Figure 1:
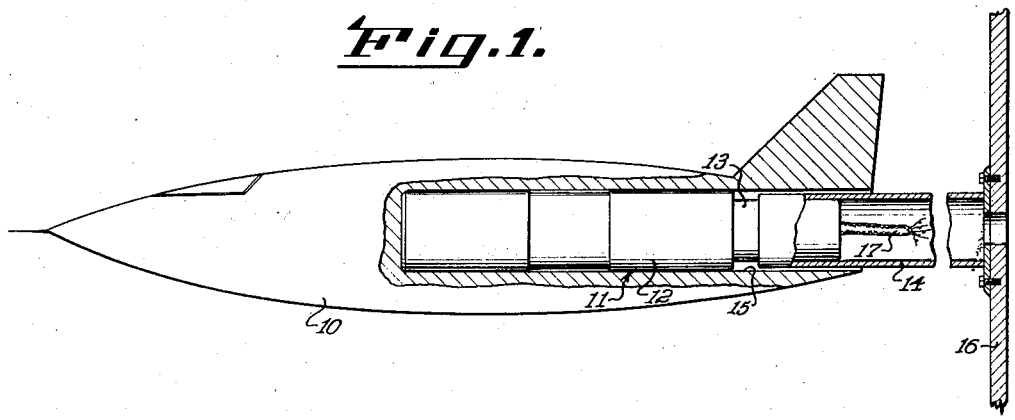
Fig. 1 illustrates a test model supported on a force balance.

In Fig. 1 a representative test model and airframe 10 is shown supported in position for wind loading by the force balance generally indicated at 11 to include an outer sleeve 12 and an inner rod 13 projecting rearwardly from within the sleeve. A strut 14 connected with the rod extends axially rearwardly from the bore 15 in the model receiving the balance to a cross member 16 typically supported within the wind tunnel, and an electrical cable 17 containing wiring from the electrical strain gages within the balance runs from the rod through the strut 14 and then to the exterior of the tunnel.

Referring to the schematic showing of Fig. 2, the hollow rod 13 extending axially within the sleeve 12 is connected therewith at the axially spaced locations 18, as will be explained with greater detail in relation to Fig. 5, the connections 18 principally serving to transmit other than axial loads from the sleeve to the rod, i. e. normal and lateral loads perpendicular to one another and to the axis, although some axial loading is transmitted by connections 18. Within the rod are two axial force gages 19 spaced at axially opposite sides of a pin 20 connecting the gages to the sleeve through openings in the rod and transmitting axial loads from the sleeve to the gages, the position of the pin being referenced as intermediate the spaced locations 18 and preferably intermediate the opposite ends of the sleeve. The two gages 19 are respectively connected in axial load transmitting relation with the rod at two other positions 21 also at axially opposite sides of the reference position and equidistant therefrom. When the sleeve is axially loaded in the direction of arrow 22, tension and compression loads are respectively transmitted through the gages 19 as shown in Fig. 2.

Figure 2:
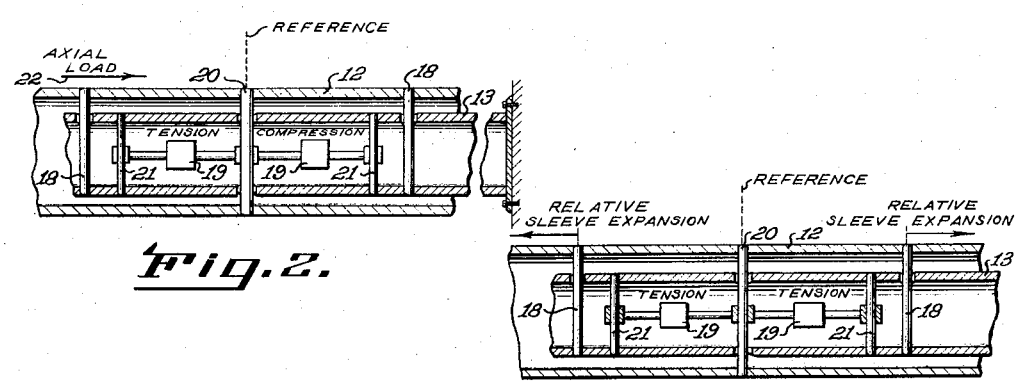
Fig. 2 is a schematic representation of the present force balance showing conditions at the gages during axial loading.
Figure 3:
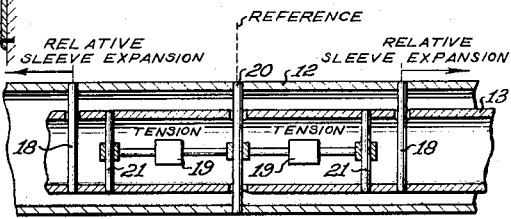
Fig. 3 is also a schematic representation of the present balance showing conditions at the gages during differential heating of the balance.

In Fig. 3 embodying the same construction as in Fig. 2, and representing conditions at the gages during differential heating of the sleeve and rod, both gages 19 transmit equal tension loads when those rod portions between the reference pin 20 and connections 21 are heated, since they expand equally and oppositely from the reference. Any relative heating and expansion of the sleeve is not transmitted through pin 20 to the gages as axial loading since the sleeve expands equally on opposite axial sides of the reference 20, and any absolute displacement of the reference does not affect the gage reading since the gages are connected to the reference. Such sleeve relative expansion due to heating causes transmission of unwanted axial loading to the hollow rod or inner sleeve through connections 18, to the extent the latter are capable of transmitting such axial loading. Therefore, true and unwanted loading can be distinguished by effecting cancellation of the force gage outputs resulting from differential rod and sleeve heating, as will be described.

Referring now to Figs. 5 through 9, an actual force balance constructed in accordance with the present invention is shown to comprise an outer sleeve 23 containing axially spaced openings 24 for receiving fasteners connecting the sleeve to a test model. An axially elongated hollow rod 25 is mounted within the sleeve in spaced relation thereto to accommodate relative sleeve displacement not only in the axial direction but also sleeve twisting about the axis and normal and lateral displacement perpendicular thereto. Strain gage supports 26 and 27 interconnect the sleeve and rod at axially spaced locations, the two supports 26 to receive normal force components, and the two supports 27 side force components.

Each of the supports 26 and 27 has opposite internally threaded ends 28 connected respectively to the rod and sleeve by screws 29, and includes an integral loop 30 intermediate the ends and pairs of integral relatively normal webs or flexures 31 and 32 extending in planes between the support ends, as better described in United States Patent No. 2,796,503, issued June 18, 1957. The webs are adapted to transmit force and also to flex in response thereto, and for the purposes of the present invention it will be understood that the supports 26 and 27 are used to register normal and side force loading transmitted from the sleeve through the supports to the rod. Strain gages 33 are bonded to the sides of the beam columns forming the loop 30 for measuring force applied endwise through the supports.

Mounted within the hollow rod between supports 26 and 27 are a generally cylindrical roll gage 35 and an elongated axial or chord force gage 36 extending within the hollow roll gage. Opposite end portions 37 and 38 of both these gages are connected with the rod by dowel pins 39 extending transversely through drill openings in the end portions and rod. Finally, intermediate portions 40 and 41 of the roll and axial force gages are connected with the sleeve by dowel pins 42 extending transversely through drill openings in these intermediate portions, the sleeve and end spacers 43 interposed between the roll gage and sleeve within enlarged apertures 143, in the rod. Dowel pins 42 are located on axially opposite sides of transverse reference plane 26, which is intermediate the ends of sleeve 23, the supports 26 and 27 and the pins 39.

Strain gages 44 are bonded to thin ring-shaped sections 45 of the roll gage at opposite sides of the transverse reference plane 46, the strain gage axes extending at 45° angles relative to the axis 147 of the balance so as to measure relative twisting as between intermediate and end portions 41 and 37 of the roll gage. Since two symmetric roll registering sections 45 are provided, the roll gage is twice as sensitive to relative roll of the sleeve as it would otherwise be using only one section 45.

The force gage 36 comprises an integral elongated support having its intermediate and end portions 41 and 38 integral loops 47 at opposite sides of the reference plane 46 with axially spaced flexures 48 and 49 extending in axial planes between each loop and end portion 38 and also between the loops and intermediate portion 41. The flexures are formed substantially as described in the previously mentioned United States Patent No. 2,796,503, and are designed to transmit axial force while flexing in response to application of force other than endwise, so that strains produced at the loops 47 result primarily from axially transmitted loads.

Strain gages 50 through 53 are connected respectively with the outside and inside surfaces of one eccentric beam column and with the inside and outside surfaces of the other eccentric beam column 54 in each loop formed by the two columns, the gages extending in axially elongated planes so that as the beams bend in response to transmission of axial loads the gages have their resistance characteristics changed in accordance with changes in loading.

Figure 4:
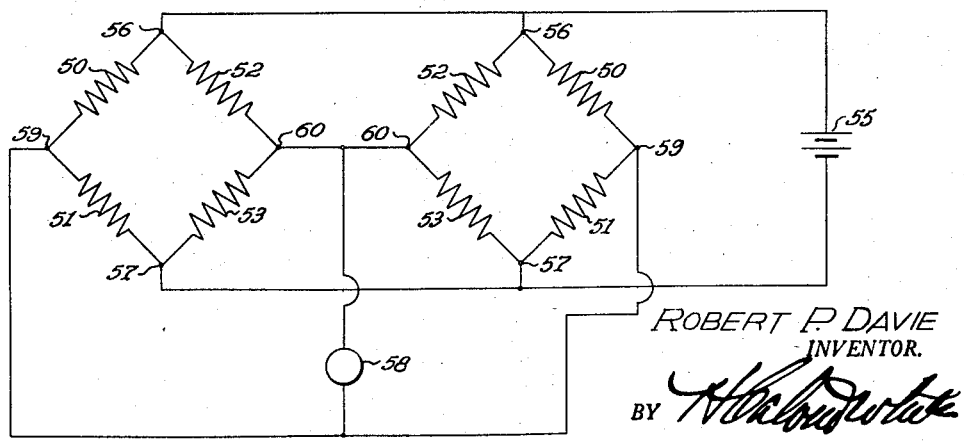
Fig. 4 illustrates the electrical connection at the gages.

Referring back to Fig. 4 the gages bonded to each integral loop 47 of Fig. 5 are shown interconnected to form a Wheatstone bridge circuit, of which each of the gages forms one leg, and pairs of symmetrically located gages are connected as opposite legs of the circuit. A source of current comprising a battery 55 is connected across terminals 56 and 57 representing the junctions between gages 50 and 52 and gages 51 and 53 respectively. For measurement purposes, a current sensitive instrument 58 is connected between terminals 59 and 60 of both bridges, terminals 59 representing the junctions between gages 50 and 51 while terminals 60 represent the junctions between gages 52 and 53.

In operation, when a load is exerted on the sleeve in the axial direction as designated by the arrow 22 in Fig. 5, it is transmitted through the integral loops 47 of the axial force gage in such a way that strain gages 50 and 53 on one loop will be placed in tension while gages 50 and 53 on the other loop will be subjected to compression, whereas gages 51 and 52 on the first loop will be in compression and gages 51 and 52 of the other loop in tension. Therefore, the particular interconnection of the bridges shown in Fig. 4 will result in the passage of current through the instrument 58 and it will read to indicate the amount of such load.

On the other hand, if the rod 23 is heated relative to the sleeve 25, gages 50 and 53 on each loop will be placed in compression whereas gages 51 and 52 will go into tension, no current can flow through instrument 58 and no reading will be obtained. Thus the force balance is directly temperature compensated as a result of the novel symmetrical construction of the force balance and in particular the provided force gage means.

I claim:

1. A temperature compensated force balance, comprising longitudinally extending means for mounting a test body subject to longitudinal and other than longitudinal loading and heating, a carrier, first connecting means including longitudinal force gages longitudinally spaced apart and intermediate structure in the space between the gages interconnecting said mounting means and carrier for transmitting the bulk of said longitudinal loading in sequence from said mounting means through said structure and gages to said carrier, and other connecting means interconnecting said mounting means and carrier independently of said first connecting means for transmitting the bulk of said other loading from the mounting means to the carrier, said first connecting means being adapted to flex in response to application thereto of other than longitudinal loading and said other connecting means being adapted to flex in response to application thereto of longitudinal loading, whereby said longitudinal force gages are adapted to produce output in response to longitudinal loading applied to said mounting means and substantially no change in output in response to application of other than longitudinal loading to said mounting means and differential heating of said mounting means and carrier.

2. A temperature compensated force balance, comprising longitudinally extending means for mounting a test body subject to longitudinal and other than longitudinal loading and heating, a carrier, first connecting means including longitudinal force gages longitudinally spaced apart and intermediate structure in the space between the gages interconnecting said mounting means and carrier for transmitting the bulk of said longitudinal loading in sequence from said mounting means through said structure and gages to said carrier, longitudinal force gages being adapted to transmit tension and compression loading respectively, and other connecting means interconnecting said mounting means and carrier independently of said first connecting means for transmitting the bulk of said other loading from the mounting means to the carrier, said first connecting means being adapted to flex in response to application thereto of other than longitudinal loading and said other connecting means being adapted to flex in response to application thereto of longitudinal loading, whereby said longitudinal force gages are adapted to produce output in response to longitudinal loading applied to said mounting means and substantially no change in output in response to application of other than longitudinal loading to said mounting means and differential heating of said mounting means and carrier.

3. A temperature compensated force balance, comprising longitudinally extending means for mounting a test body subject to longitudinal and other than longitudinal loading and heating, a carrier, first connecting means including longitudinal force gages longitudinally spaced apart and intermediate structure in the space between the gages interconnecting said mounting means and carrier for transmitting the bulk of said longitudinal loading in sequence from said mounting means through said structure and gages to said carrier, and other connecting means including other force gages interconnecting said mounting means and carrier independently of said first connecting means for transmitting the bulk of said other loading from the mounting means to the carrier, said first connecting means being adapted to flex in response to application thereto of other than longitudinal loading and said other connecting means being adapted to flex in response to application thereto of longitudinal loading, whereby said longitudinal force gages are adapted to produce output in response to longitudinal loading applied to said mounting means and substantially no change in output in response to application of other than longitudinal loading to said mounting means and differential heating of said mounting means and carrier.

4. A temperature compensated force balance, comprising longitudinally extending means for mounting a test body subject to longitudinal and other than longitudinal loading and heating, a carrier, first connecting means including longitudinal force gages longitudinally spaced apart and intermediate structure in the space between the gages interconnecting said mounting means and carrier for transmitting the bulk of said longitudinal loading in sequence from said mounting means through said structure and gages to said carrier, and other connecting means including other force gages interconnecting said mounting means and carrier independently of said first connecting means for transmitting the bulk of said other loading from the mounting means to the carrier, said first connecting means being adapted to flex in response to application thereto of other than longitudinal loading and said other connecting means being adapted to flex in response to application thereto of longitudinal loading, said other force gages being longitudinally spaced apart and said first connecting means being in said space between said other force gages, whereby said longitudinal force gages are adapted to produce output in response to longitudinal loading applied to said mounting means and substantially no change in output in response to application of other than longitudinal loading to said mounting means and differential heating of said mounting means and carrier.

5. A temperature compensated force balance, comprising an axially longitudinally elongated sleeve for mounting a test body subject to longitudinal and lateral loading and heating, a carrier, first connecting means including longitudinal force gages longitudinally spaced apart and intermediate structure in the space between said gages interconnecting said sleeve and carrier for transmitting the bulk of said longitudinal loading in sequence from said sleeve through said structure and gages to said carrier, longitudinal force gages being adapted to transmit tension and compression loading respectively, and other connecting means interconnecting said sleeve and carrier independently of said first connecting means for transmitting the bulk of said lateral loading from the sleeve to the carrier, said first connecting means including pivots adapted to flex in response to application thereto of lateral loading and said other connecting means including pivots adapted to flex in response to application thereto of longitudinal loading, whereby said longitudinal force gages are adapted to produce output in response to longitudinal loading applied to said sleeve and substantially no change in output in response to application of lateral loading to said sleeve and differential heating of said sleeve, carrier and connecting means, said carrier and connecting means being within said sleeve.

6. A temperature compensated force balance, comprising an axially longitudinally elongated sleeve for mounting a test body subject to longitudinal and lateral loading and heating, a carrier, first connecting means including longitudinal force gages longitudinally spaced apart and intermediate structure in the space between said gages interconnecting said sleeve and carrier for transmitting the bulk of said longitudinal loading in sequence from said sleeve through said structure and gages to said carrier, longitudinal force gages being adapted to transmit tension and compression loading respectively, and other connecting means including lateral force gages interconnecting said sleeve and carrier independently of said first connecting means for transmitting the bulk of said lateral loading from the sleeve to the carrier, said first connecting means including pivots adapted to flex in response to application thereto of lateral loading and said other connecting means including pivots adapted to flex in response to application thereto of longitudinal loading, said lateral force gages being longitudinally spaced apart and said first connecting means being in said space between said lateral force gages, whereby said longitudinal force gages are adapted to produce output in response to longitudinal loading applied to said sleeve and substantially no change in output in response to application of lateral loading to said sleeve and differential heating of said sleeve, carrier and connecting means, said carrier and connecting means being within said sleeve.

7. The invention as defined in claim 6 in which said longitudinal force gages are interconnected to produce a combined output.

8. A temperature compensated force balance, comprising an axially longitudinally elongated outer sleeve for mounting a test body subject to longitudinal and lateral loading and heating, a carrier sleeve extending longitudinally within said outer sleeve, first connecting means including longitudinal force gages longitudinally spaced apart within said carrier sleeve and intermediate structure in the space between said gages interconnecting said outer and carrier sleeves for transmitting the bulk of said longitudinal loading in sequence from said outer sleeve through said structure and gages to said carrier sleeve, longitudinal force gages being adapted to transmit tension and compression loading respectively, and other connecting means including lateral force gages in said carrier sleeve interconnecting said outer and carrier sleeves independently of said first connecting means for transmitting the bulk of said lateral loading from the outer sleeve to the carrier, said first connecting means including pivots adapted to flex in response to application thereto of lateral loading and said other connecting means including pivots adapted to flex in response to application thereto of longitudinal loading, said lateral force gages being longitudinally spaced apart and said first connecting means being in said space between said lateral force gages, whereby said longitudinal force gages are adapted to produce output in response to longitudinal loading applied to said outer sleeve and substantially no change in output in response to application of lateral loading to said outer sleeve and differential heating of said sleeves and connecting means.

9. The invention as defined in claim 8 including additional connecting means including roll force gages longitudinaly spaced apart within said carrier sleeve and interconnecting said outer and carrier sleeves independently of said first and other connecting means.

10. The invention as defined in claim 8 in which said longitudinal force gages include beam columns and electrically interconnected resistance type strain gages attached thereto, said columns extending in laterally offset relation to the axis of said outer sleeve for bending and straining said gages in response to longitudinal load transmission through the columns.

11. The invention as defined in claim 10 in which said beam columns and structure are integral.

12. The invention as defined in claim 10 in which said beam columns extend longitudinally and in which said strain gages are bonded to laterally opposite and longitudinally extending surfaces of said columns.

13. The invention as defined in claim 12 in which said strain gages are interconnected in a bridge circuit adapted to remain in electrical balance during said differential heating and to become unbalanced during transmission of longitudinal loading through said columns.

14. The invention as defined in claim 13 comprising four beam columns and in which said strain gages are connected in two interconnected Wheatstone bridge circuits.

15. The invention as defined in claim 13 in which said lateral force gages include laterally extending eccentric beam columns and resistance type strain gages attached thereto within said carrier sleeve.

16. The invention as defined in claim 8 in which said carrier sleeve contains lateral openings therethrough and said connecting means extend through said openings with clearance between said connecting means and carrier sleeve at said openings.

17. The invention as defined in claim 16 in which said first connecting means includes dowel means extending through said openings and connected with said outer sleeve and said structure.

References Cited in the file of this patent
UNITED STATES PATENTS

| | | |
|---|---|---|
| 1,906,551 | De Forest | May 2, 1933 |
| 2,593,169 | Moore | Apr. 15, 1952 |
| 2,782,636 | Peucker | Feb. 26, 1957 |
| 2,785,569 | Miller | Mar. 19, 1957 |
| 2,796,503 | Ward | June 18, 1957 |